United States Patent
Sze et al.

(10) Patent No.: US 10,852,519 B2
(45) Date of Patent: Dec. 1, 2020

(54) CONFOCAL IMAGING OF AN OBJECT UTILISING A PINHOLE ARRAY

(71) Applicant: ASM Technology Singapore Pte Ltd, Singapore (SG)

(72) Inventors: Wui Fung Sze, Kwai Chung (HK); Jiangwen Deng, Kwai Chung (HK)

(73) Assignee: ASM TECHNOLOGY SINGAPORE PTE LTD, Singapore (SG)

( * ) Notice: Subject to any disclaimer, the term of this patent is extended or adjusted under 35 U.S.C. 154(b) by 64 days.

(21) Appl. No.: 15/365,066

(22) Filed: Nov. 30, 2016

(65) Prior Publication Data

US 2018/0149848 A1 May 31, 2018

(51) Int. Cl.
*G02B 21/00* (2006.01)
*H04N 5/372* (2011.01)

(52) U.S. Cl.
CPC ..... *G02B 21/0044* (2013.01); *G02B 21/0016* (2013.01); *G02B 21/0028* (2013.01); *G02B 21/0032* (2013.01); *H04N 5/372* (2013.01)

(58) Field of Classification Search
CPC ............ G02B 21/0044; G02B 21/0016; G02B 21/0028; G02B 21/0032; H04N 5/372; G01N 21/01; G01N 21/21
See application file for complete search history.

(56) References Cited

U.S. PATENT DOCUMENTS

| | | | |
|---|---|---|---|
| 5,001,409 A * | 3/1991 | Hosaka | B82Y 10/00 318/592 |
| 2001/0012069 A1 | 8/2001 | Derndinger et al. | |
| 2007/0035734 A1 * | 2/2007 | Muller | G01N 21/31 356/432 |
| 2009/0021750 A1 * | 1/2009 | Korner | G01B 11/25 356/601 |
| 2009/0187378 A1 * | 7/2009 | Kusunose | G01B 11/22 702/166 |
| 2011/0140000 A1 * | 6/2011 | Iketaki | G02B 21/0068 250/458.1 |

(Continued)

FOREIGN PATENT DOCUMENTS

| JP | H10-326587 | 12/1998 |
|---|---|---|
| JP | 2006-337103 | 12/2006 |

(Continued)

OTHER PUBLICATIONS

Office Action dated Oct. 8, 2018 issued in corresponding Taiwan Patent Application No. 106139806 with English translation.

(Continued)

*Primary Examiner* — Michael J Hess
(74) *Attorney, Agent, or Firm* — Ostrolenk Faber LLP

(57) ABSTRACT

A confocal imaging apparatus for inspecting an object comprises a light source operative to project light to illuminate the object, and an imaging device for receiving light reflected from the object along a lighting path located between the object and the imaging device. A pinhole array comprising a plurality of pinholes is positioned along the lighting path such that light reflected from the object is passed through the pinhole array. A mechanism is operative to move the pinhole array along a single axis in a linear direction transverse to the light path for transmitting an image corresponding to a substantially contiguous area of the object onto the imaging device.

15 Claims, 3 Drawing Sheets

(56) References Cited

U.S. PATENT DOCUMENTS

| | | | |
|---|---|---|---|
| 2012/0281258 A1* | 11/2012 | Sheblee | G02B 21/0072 |
| | | | 358/474 |
| 2013/0128346 A1* | 5/2013 | Sanguu | G02B 21/06 |
| | | | 359/385 |
| 2014/0291304 A1* | 10/2014 | Mudd, II | B23K 26/32 |
| | | | 219/121.61 |
| 2015/0286041 A1* | 10/2015 | Sheblee | G02B 21/0072 |
| | | | 348/79 |
| 2016/0206199 A1* | 7/2016 | Blanco | G02B 21/0004 |
| 2016/0299170 A1* | 10/2016 | Ito | G02B 26/10 |
| 2017/0276608 A1* | 9/2017 | Kanarowski | G02B 21/0032 |
| 2018/0136040 A1* | 5/2018 | Sodeoka | G01J 3/18 |

FOREIGN PATENT DOCUMENTS

| | | |
|---|---|---|
| JP | 2014-142183 | 8/2014 |
| WO | WO 2015/164844 A1 | 10/2015 |

OTHER PUBLICATIONS

Korean Office Action dated Apr. 9, 2019 issued in Korean Patent Application No. 10-2017-0161560 with an English language translation.

Japanese Office Action dated Jan. 28, 2019 issued in Japanese Patent Application No. 2017-228855 with an English language translation.

* cited by examiner

CONFOCAL IMAGING OF AN OBJECT UTILISING A PINHOLE ARRAY

FIELD OF THE INVENTION

The invention relates to an inspection apparatus, and in particular to a confocal inspection apparatus for imaging a surface of an object.

BACKGROUND AND PRIOR ART

In electronic packaging applications, inspection of an object or a workpiece is commonly required for checking the quality of an end-product. For such inspection, confocal imaging techniques are capable of providing high resolution two-dimensional images. Additionally, high-precision inspection of three-dimensional profiles is also desirable for many inspection applications for electronic packaging, such as ball thickness measurement in wire bonding process control.

In respect of one approach to confocal imaging, the use of a plate comprising one or more pinholes is an important development as it helps to eliminate out-of-focus light rays entering the optical system that is used for imaging. Nevertheless, such a pinhole plate limits the light that is captured by the confocal system to obtain imaging data of better quality. In order to obtain a denser area image, lateral scanning is generally required to obtain better image data. In consideration of improving the scanning speed, the use of a spinning disk comprising multiple pinholes is widely adopted in area imaging confocal systems.

Such a spinning disk may comprise a Nipkow disk 100, which is illustrated in FIG. 1. The Nipkow disk 100 generally comprises a light source 102 for illuminating an object 116 to be observed, and a microlens disk 106 and a pinhole disk 110 which rotate about a rotary axis 108. The microlens disk 106 contains micro-lenses 104 and is placed before the pinhole disk 110 containing pinholes 112. Every pinhole 112 has an associated micro-lens 104.

Each micro-lens 104 is configured to capture a broad band of light and to focus it into each pinhole 112, thus significantly increasing the amount of light directed into each pinhole 112 and reducing the amount of light blocked by the spinning pinhole disk 110.

The illumination from the light source 102 is passed through a beam splitter 122 positioned between the micro-lens disk 106 and the pinhole disk 110, and is then focused by an objective lens 114 onto an object 116. An image of the object 116 is reflected by the beam splitter 122 towards a focusing lens 118 which focuses the image of the object 116 onto a sensor or camera 120. The Nipkow disk 100 is the most commonly adopted configuration for an area scanning confocal system that is able to capture an image continuously when its pinhole disk 110 is spinning at a constant angular speed.

The pinhole disk 110 may be made of any suitable material such as metal, plastic or cardboard, and has a pattern of pinholes 112 of equal diameter which are separated by equal distances from each other. The pinholes 112 may be circular or square. These pinholes 112 may be positioned to substantially form a single-turn spiral starting from an external radial point of the pinhole disk 110 and proceeding to a center of the pinhole disk 110. When the pinhole disk 110 rotates, the pinholes 112 trace circular ring patterns, with their inner and outer diameters depending on a position of each pinhole 112 on the pinhole disk 110 and a thickness equal to a diameter of each pinhole 112. The circular ring patterns may or may not partially overlap, depending on the exact construction of the pinhole disk 110. The objective lens 114 projects the image of the object 116 in front of the objective lens 114 directly onto the pinhole disk 110.

Each pinhole 112 in the spiral traces a section of the image which is picked up as a pattern of light and dark areas by the camera 120. When spinning the pinhole disk 110 while observing the object 116 through the pinhole disk 110 through a relatively small sector of the pinhole disk 110, for example, an angular quarter or eighth of the disk, the object 116 appears to be scanned line by line, first by length or height or even diagonally, depending on the exact sector chosen for observation. By spinning the pinhole disk 110 fast enough, the object 116 seems complete and it is possible to capture a whole area of the object. The size of the reproduced image is determined by the size of the pinhole disk 110, with a larger disk producing a larger image.

The design of the Nipkow disk 100 requires rotation of the pinhole disk 110 and its advantage is that such an inspection system is capable of capturing images continuously when the pinhole disk 110 is spinning at a constant angular speed. However, it requires a pinhole disk 110 with a very large diameter relative to the area that is being imaged, because the pinhole patterns need to travel or rotate about the rotary axis 108 of the pinhole disk 110. Moreover, since the pinholes 112 are spread across the pinhole disk 110 and are at different distances from the rotary axis 108, they are moving at different speeds because a velocity of each pinhole 112 is a multiple of its angular velocity and its radius from the rotary axis 108. As such, they effectively present different exposure times onto the imaging sensor or camera 120, since the exposure is inversely proportional to the velocity of the pinhole 112. Good uniformity, if any, can only be realized when the angular opening is very narrow, which places constraints on the dimensions of the spinning pinhole disk 110.

The spinning disk approach is thus undesirable for inspection systems, especially inspection systems that include optical components with different resolutions, fields of view and depths of field. Such inspection systems would be required in applications such as wire bonding ball bond inspection, which needs to inspect both the ball bonds using high resolution optics, and the bonding wires attached thereto using large depth of field optics which are only capable of lower resolution.

SUMMARY OF THE INVENTION

It is thus an object of the invention to seek to provide a relatively compact inspection apparatus that avoids at least some of the shortcomings of the aforesaid prior art.

According to a first aspect of the invention, there is provided a confocal imaging apparatus for inspecting an object, the apparatus comprising: a light source operative to project light to illuminate the object; an imaging device for receiving light reflected from the object along a lighting path located between the object and the imaging device; a pinhole array comprising a plurality of pinholes positioned along the lighting path such that light reflected from the object is passed through the pinhole array; and a mechanism for moving the pinhole array along a single axis in a linear direction transverse to the light path for transmitting an image corresponding to a substantially contiguous area of the object onto the imaging device.

According to a second aspect of the invention, there is provided a method for inspecting an object using a confocal imaging apparatus, the method comprising the steps of: illuminating the object by projecting light from a light source onto the object; receiving with an imaging device light reflected from the object along a lighting path located between the object and the imaging device, wherein light reflected from the object is passed through a pinhole array comprising a plurality of pinholes positioned along the lighting path; and moving the pinhole array along a single axis in a linear direction transverse to the light path for transmitting an image corresponding to a substantially contiguous area of the object onto the imaging device for inspecting the object.

It would be convenient hereinafter to describe the invention in greater detail by reference to the accompanying drawings which illustrate a specific preferred embodiment of the invention. The particularity of the drawings and the related description is not to be understood as superseding the generality of the broad identification of the invention as defined by the claims.

BRIEF DESCRIPTION OF THE DRAWINGS

An example of a confocal inspection apparatus in accordance with the invention will now be described with reference to the accompanying drawings, in which.

DETAILED DESCRIPTION OF THE PREFERRED EMBODIMENT OF THE INVENTION

Figure 1:
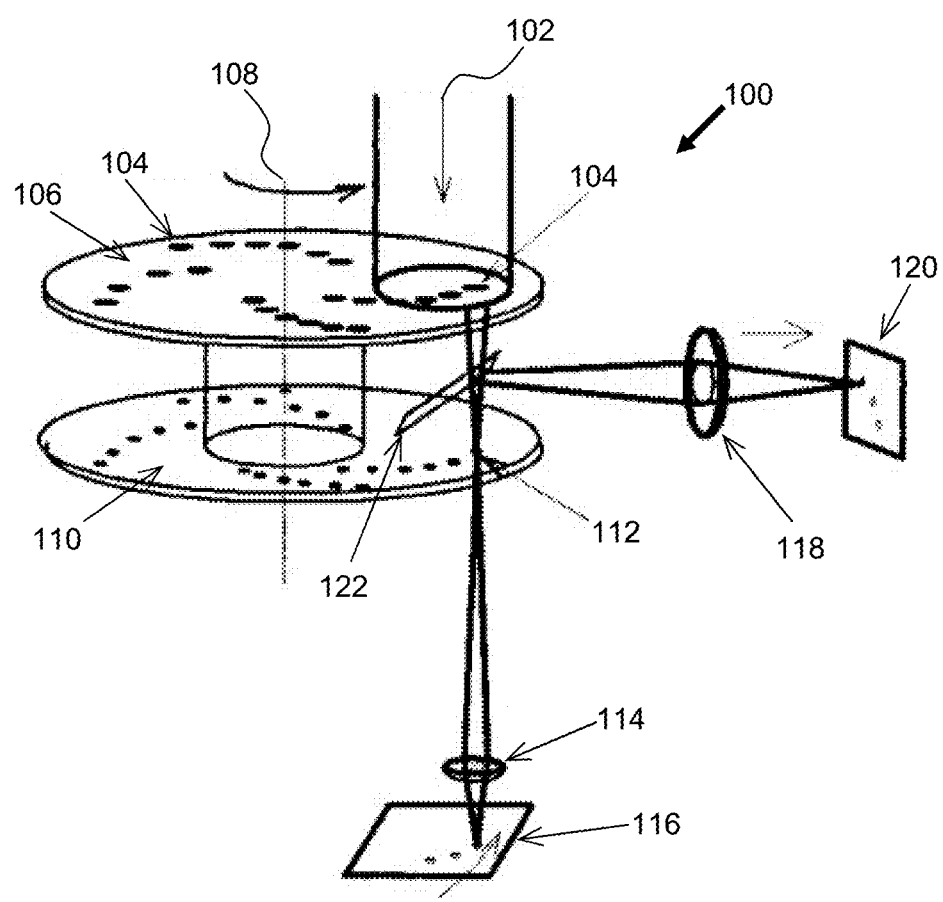
FIG. 1 is an isometric view of a prior art Nipkow disk that is used for scanning an object surface.
Figure 2:
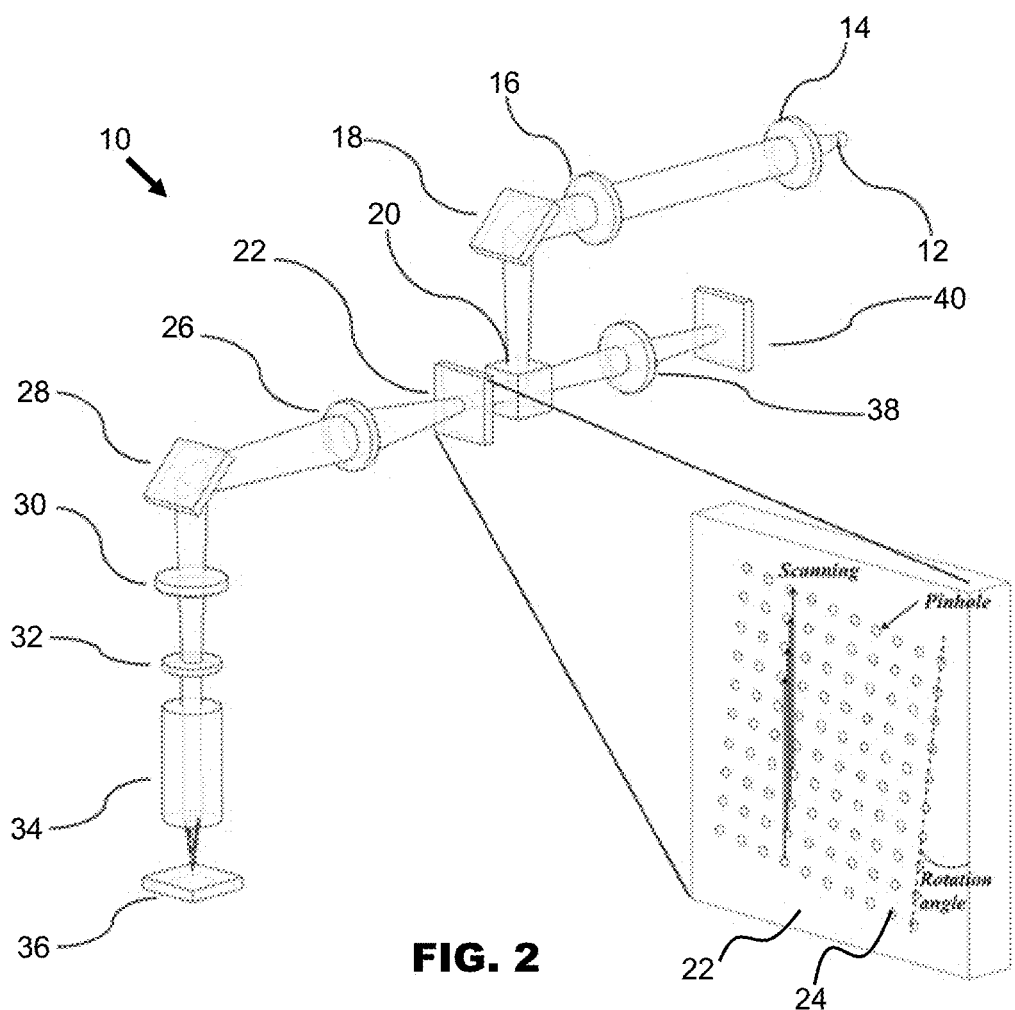
FIG. 2 is an isometric view of a confocal inspection apparatus in accordance with the preferred embodiment of the invention.

FIG. 2 is an isometric view of a confocal inspection apparatus 10 utilizing confocal imaging principles in accordance with the preferred embodiment of the invention. The confocal inspection apparatus 10 comprises a light source 12 that is operative to project light to illuminate an object 36. The light source 12 generates light rays that are passed through a condenser lens 14, followed by a Fresnel lens 16. The light rays are then reflected by a first mirror 18 towards a polarizing beam splitter 20.

The polarizing beam splitter 20 directs the light rays along a lighting path through a pinhole array 22 (comprising a pinhole plate having a plurality of pinholes 24), and a tube lens 26 onto a second mirror 28. The second mirror 28 reflects the light rays through a chromatic element 30, a quarter-wavelength waveplate 32 and an objective lens 34, which focuses the light rays onto the object 36 to be inspected. The confocal inspection apparatus 10 is different from conventional chromatic confocal systems in that a pinhole array pattern instead of a single pinhole is fabricated on the pinhole plate. The polarizing beam splitter 20 and the quarter-wavelength waveplate 32 function to suppress internal stray light rays on the surfaces of the various lenses.

Light rays that are reflected from the object 36 are directed back along the lighting path through the objective lens 34, quarter-wavelength waveplate 32, chromatic element 30, second mirror 28, tube lens 26 and pinhole array 22 towards the polarizing beam splitter 20. Accordingly, light projected from the light source 12 is passed through the pinhole array 22 both before illuminating the object 36 and after being reflected from the object 36. Such received light rays are passed through the polarizing beam splitter 20 onto an imaging lens 38, and the resultant image is imaged by an imaging device, such as a CCD camera 40.

Figure 3:
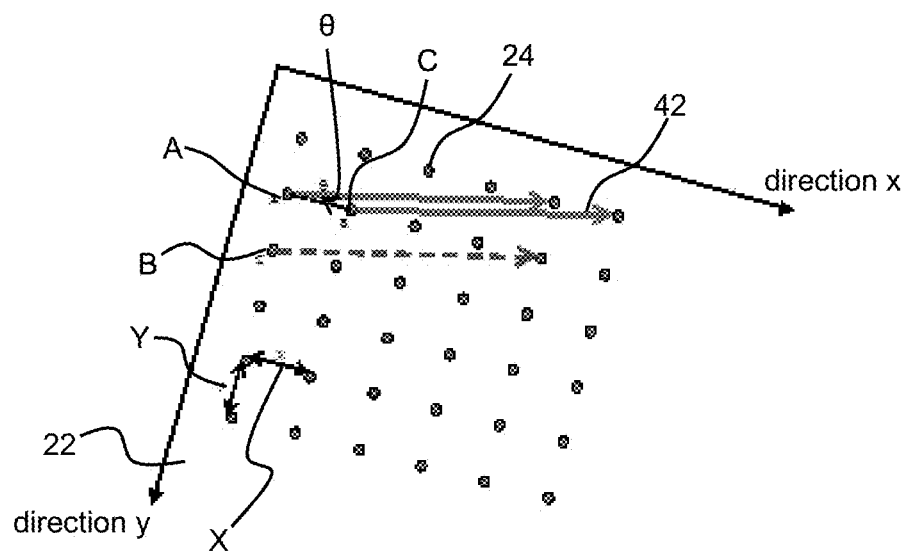
FIG. 3 is a plan view of a pinhole array which is usable with the confocal inspection apparatus illustrated in FIG. 2.

FIG. 3 is a plan view of a pinhole array 22 which is usable with the confocal inspection apparatus 10 illustrated in FIG. 2. Using the pinhole array 22, a whole area incorporating the array of pinholes 24 can be effectively utilized for obtaining a confocal image by motion of the pinhole array 22 along a single axis. Hence, the final system may be constructed to be small in size.

In the configuration of the pinhole array 22, the pinholes 24 each has a diameter D and are arranged in a regular matrix pattern or arrangement, each pinhole 24 being separated from another pinhole by a width X in direction x and a height Y in direction y. In other words, the transmission ratio T is:

$$T = \pi D^2 / (4XY). \tag{1}$$

The pinholes 24 should be moved when the matrix pattern is slanted at a certain angle θ with respect to a linear direction moved by the pinhole array 22, as illustrated in FIG. 3, so that the field of view of the image can be completely filled by a single-axis motion of the pinhole array 22. The computation of θ is as follows:

1. The distance between two scan lines yielded by two neighboring pinholes A and B in direction x is X·sin θ;

2. The distance between two scan lines yielded by two neighboring pinholes A and C in direction y is Y·cos θ;

In order to have uniformly distributed scan lines, Y·cos θ should be integers of multiplicands of X·sin θ, i.e.

$$Y \cdot \cos\theta = N \cdot X \cdot \sin\theta$$

which gives:

$$\theta = \tan^{-1}(Y/(N \cdot X)). \tag{2}$$

The value N should be selected such that the pinhole scan lines can fully fill the whole of the desired field of view. The value of N·X must also be larger than Y·cos θ. For example, if two adjacent scan lines overlap half of the width, we need $$N \cdot X \approx 2Y \cdot \cos\theta$$

When θ is small, cos θ≈1 and hence:

$$N = [2Y/D] \tag{3}$$

It is observed that the amount of overlapping can affect the uniformity of intensity of the image in directions perpendicular to the scan lines 42. However, since the pattern of intensity is constant, such variation in uniformity can be compensated by calibration.

It can be shown that, in order to produce a complete scan of a selected area, the travel distance $T_d$ of a pinhole 24 should be:

$$T_d = K \cdot (N \cdot X \cdot \cos\theta + Y \cdot \sin\theta) - D. \tag{4}$$

where K is a positive integer.

For example a pinhole matrix comprising circular pinholes 24, each with a diameter of 10 μm, may have a targeted transmission ratio of about 1/40. It should be noted that since adjacent pinholes 24 may affect each other and may cause artifacts, the value of the transmission ratio should not be too large. In general, the separation distance (X) between adjacent pinholes 24 in direction x should be equal to the separation distance (Y) between adjacent pinholes 24 in the direction y perpendicular to the direction x, so that any cross-talk between pinholes 24 is isotopic along both direction x and direction y. Hence, from equation (1), $$X = Y = (40 \times \pi \times 10^2 / 4)^{1/2} = 56 \ \mu m;$$

and from equation (3)

$$N = [2 \times 56/10] = 11.$$

According to equation (2), the slanting angle of the pinhole array 22 relative to the linear motion axis should be:

$$\theta = \tan^{-1}(Y/(N \cdot X)) = \tan^{-1}(1/11) = 5.19°$$

For K=1 in equation (4), the scanning distance for the pinhole array 22 is:

$$T_d > (11 \cdot 56 \cdot \cos(5.19°) + 56 \cdot \sin(5.19°) - 10) = 608.5 \ \mu m.$$

As explained above, the angle θ is selected such that a whole of a substantially contiguous area of the object is transmittable onto the CCD camera 40 utilizing the said motion of the pinhole array 22 in the linear direction only. Moreover, the angle θ is selected so that a field of view of the image of the substantially contiguous area of the object 36 is completely filled by motion of the pinhole array 22 in the linear direction A bi-directional periodic motion is preferably implemented under this configuration of the pinhole array 22. This means that the pinhole plate comprising the pinholes 24 is moved forwards and backwards alternately in the linear direction relative to the light path at a substantially constant speed for each scanning operation.

Figure 4:
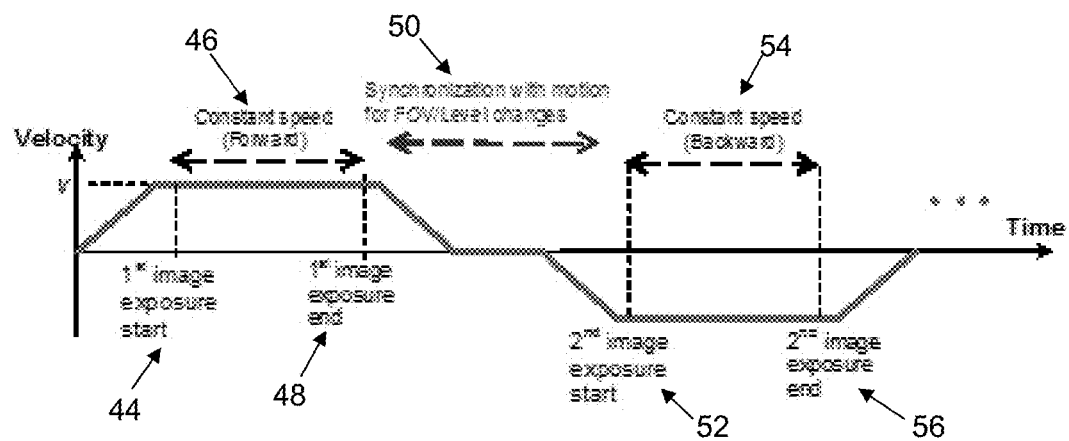
FIG. 4 is a graph illustrating an exemplary image capturing sequence in connection with the use of the pinhole array.

FIG. 4 is a graph illustrating an exemplary image capturing sequence in connection with the use of the pinhole array 22. The image capturing sequence will include generally three stages.

During the first stage, the pinhole array 22 is accelerated along the scanning direction 42 to a designated velocity. A first image exposure of the CCD camera 40 is started 44, during which the velocity of the pinhole array 22 is kept constant in a forward direction 46.

During the second stage, when the pinhole array 22 is travelling at a constant velocity, the camera exposure is operative and is continued until a predetermined travelling distance is reached by the pinhole array 22. At that point, the camera exposure for the first image ends 48, and data from the CCD camera 40 is transferred to a processor for processing.

During the third stage, the pinhole array 22 is decelerated until it comes to a complete stop. A certain amount of time is required to reverse the direction of movement of the pinhole array 22 backwards. Such an interval of time can be utilized for other synchronization motions, such as switching the field of view or changing a height level of the camera for vertical scanning 50.

Thereafter, the pinhole array 22 is accelerated in the backwards direction to a designated constant velocity, and a second image exposure of the CCD camera 40 is started 52. When the pinhole array 22 is travelling at a constant velocity in the backwards direction 54, the camera exposure is continued until a predetermined travelling distance is reached by the pinhole array 22. At that point, the camera exposure for the second image ends 56, and the pinhole array 22 is decelerated until it comes to a complete stop.

The aforesaid cycle will continue until all the desired images of the object 36 have been captured.

Figure 5A:
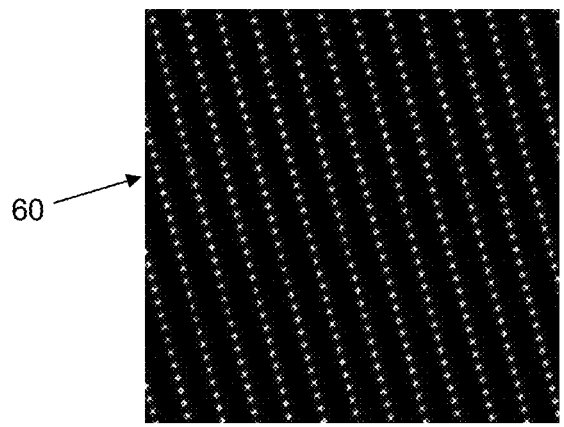
FIGS. 5A and 5B are images of a static pinhole array and a confocal image respectively obtained by the confocal inspection apparatus according to the preferred embodiment of the invention.
Figure 5B:
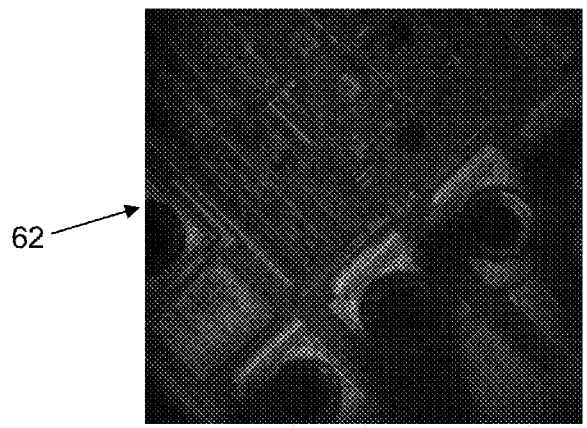

FIGS. 5A and 5B are images of a static pinhole array and a confocal image respectively obtained by the confocal inspection apparatus according to the preferred embodiment of the invention. In FIG. 5A, the image 60 illustrates a slanted matrix of pinholes 24. In FIG. 5B, the captured image 62 illustrates a field of view comprising a whole of the area to be inspected, after the pinhole array 22 has been moved along the scanning direction 42 during the process of image capturing.

It should be appreciated that the confocal inspection apparatus 10 according to the preferred embodiment of the invention provides a pinhole scanning configuration utilizing a single axis motion system that can reduce the size of pinhole array 22 significantly, and hence reduce the overall size of the confocal inspection apparatus 10. The area of the pinhole array 22 can be effectively utilized. In particular, as compared with a rotary motion system used in the prior art, the size of the linear motion system can be constructed to be much more compact. As a result, an overall size of the confocal optical system can be reduced. Furthermore, the pinhole pattern can also comprise a simple distribution, such as a pattern of a regular grid.

Moreover, the illustrated confocal inspection apparatus 10 has a pinhole pattern that is designed such that a good uniformity of intensity can be obtained over the whole field of view to be inspected.

The invention described herein is susceptible to variations, modifications and/or additions other than those specifically described and it is to be understood that the invention includes all such variations, modifications and/or additions which fall within the spirit and scope of the above description.

The invention claimed is:

1. A confocal imaging apparatus for inspecting an object, the apparatus comprising:
   a light source operative to project light to illuminate the object;
   an imaging device for receiving light reflected from the object along a lighting path located between the object and the imaging device;
   a pinhole array comprising a plurality of pinholes distributed in a rectangular matrix arrangement positioned along the lighting path on a first plane that is transverse to the lighting path such that light reflected from the object is passed through the pinhole array; and
   a mechanism for moving the pinhole array,
   wherein the confocal imaging apparatus is configured to move the pinhole array solely along a single axis in a linear path transverse to the lighting path such that the pinholes of the plurality of pinholes of the pinhole array together through motion in the linear direction transmit an image corresponding to a substantially contiguous area of the object onto the imaging device,
   wherein the rectangular matrix arrangement is fixedly rotates at an angle with respect to the linear path moved by the pinhole array and is within the first plane.

2. The confocal imaging apparatus as claimed in claim 1, wherein the pinhole array is positioned such that light projected from the light source is passed through the pinhole array before illuminating the object.

3. The confocal imaging apparatus as claimed in claim 1, wherein the pinhole array comprises a pinhole plate having the plurality of pinholes.

4. The confocal imaging apparatus as claimed in claim 1, wherein the angle is selected so that a field of view of an image of the substantially contiguous area of the object is completely filled by motion of the pinhole array in the linear direction.

5. The confocal imaging apparatus as claimed in claim 3, wherein a separation distance between adjacent pinholes in a first direction (X) of the matrix arrangement is equal to a separation distance between adjacent pinholes in a second direction (Y) perpendicular to the first direction.

6. The confocal imaging apparatus as claimed in claim 1, wherein the pinhole array is configured to be alternately moved forwards and backwards in the linear path relative to the light path at a substantially constant speed for each inspection operation.

7. The confocal imaging apparatus as claimed in claim 6, wherein an image exposure of the imaging device is operative during the movement of the pinhole array at the substantially constant speed until a predetermined travelling distance is reached by the pinhole array.

8. The confocal imaging apparatus as claimed in claim 1, further comprising a chromatic element and a quarter-wavelength waveplate positioned along the lighting path between the pinhole array and the object.

9. The confocal imaging apparatus as claimed in claim 1, wherein the imaging device comprises a CCD camera.

10. A method for inspecting an object using a confocal imaging apparatus, the method comprising the steps of:
   illuminating the object by projecting light from a light source onto the object;
   receiving with an imaging device light reflected from the object along a lighting path located between the object and the imaging device,
   wherein light reflected from the object is passed through a pinhole array comprising a plurality of pinholes distributed in a rectangular matrix arrangement positioned along the lighting path on a first plane that is transverse to the lighting path; and
   moving the pinhole array along a single axis in a linear path transverse to the lighting path such that the pinholes of the plurality of pinholes of the pinhole array together through motion in the linear direction transmit an image corresponding to a substantially contiguous area of the object onto the imaging device for inspecting the object,
   wherein the rectangular matrix arrangement is fixedly rotated at an angle with respect to the linear path moved by the pinhole array and is within the first plane.

11. The method as claimed in claim 10, wherein the pinhole array is positioned such that light projected from the light source is passed through the pinhole array before illuminating the object.

12. The method as claimed in claim 10, wherein the pinhole array comprises a pinhole plate having the plurality of pinholes.

13. The method as claimed in claim 10, further comprising:
   moving the pinhole array forwards in the linear direction in a first inspection operation, and thereafter
   moving the pinhole array backwards in the linear path direction in a second inspection operation, relative to the light path at a substantially constant speed.

14. The method as claimed in claim 13, further comprising operating an image exposure of the imaging device during the movement of the pinhole array at the substantially constant speed until a predetermined travelling distance is reached by the pinhole array.

15. The method as claimed in claim 10, wherein the imaging device comprises a CCD camera.

\* \* \* \* \*